US012559652B2

(12) United States Patent
     Wu et al.

(10) Patent No.: US 12,559,652 B2
(45) Date of Patent: Feb. 24, 2026

(54) FILM INCLUDING SOLVENT BARRIER AND PRIMER LAYER

(71) Applicant: 3M INNOVATIVE PROPERTIES COMPANY, St. Paul, MN (US)

(72) Inventors: Tianyu Wu, St. Paul, MN (US); Rajdeep S. Kalgutkar, Woodbury, MN (US); Ning Zhou, Vadnais Heights, MN (US); David B. Bilbrey, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 49 days.

(21) Appl. No.: 18/021,505

(22) PCT Filed: Aug. 18, 2021

(86) PCT No.: PCT/IB2021/057596
     § 371 (c)(1),
     (2) Date: Feb. 15, 2023

(87) PCT Pub. No.: WO2022/038537
     PCT Pub. Date: Feb. 24, 2022

(65) Prior Publication Data
     US 2023/0295391 A1     Sep. 21, 2023

Related U.S. Application Data

(60) Provisional application No. 63/068,773, filed on Aug. 21, 2020.

(51) Int. Cl.
     *C09J 7/29*     (2018.01)
     *B32B 27/04*    (2006.01)
     (Continued)

(52) U.S. Cl.
     CPC ................. *C09J 7/29* (2018.01); *B32B 27/34* (2013.01); *B32B 37/15* (2013.01); *C08J 7/043* (2020.01);
     (Continued)

(58) Field of Classification Search
     None
     See application file for complete search history.

(56) References Cited

U.S. PATENT DOCUMENTS 3,239,478 A     3/1966   Harlan, Jr.
3,935,338 A     1/1976   Robertson
                (Continued)

FOREIGN PATENT DOCUMENTS

JP     H07-304948 A     11/1995
JP     2013-509913 A     3/2013
                (Continued)

OTHER PUBLICATIONS

International Search Report for PCT International Application No. PCT/IB2021/057596, mailed on Nov. 24, 2021, 5 pages.

*Primary Examiner* — Frank D Ducheneaux
(74) *Attorney, Agent, or Firm* — Julie Lapos-Kuchar; Daniel J. Iden

(57)     ABSTRACT

Films including solvent barriers and primer layers are described. In particular, films including a substrate, the substrate including polylactic acid, a primer layer disposed on the substrate, a barrier layer disposed on the surface of the primer layer opposite the substrate, and an adhesive layer disposed on a surface of the barrier layer opposite the primer layer. The barrier layer includes an amorphous aliphatic polyamide with a glass transition temperature of at least 40 #C. Such films can provide acceptable adhesion and barrier performance to polylactic acid based graphics film systems.

13 Claims, 1 Drawing Sheet

(51) Int. Cl.

| | |
|---|---|
| *B32B 27/34* | (2006.01) |
| *B32B 37/15* | (2006.01) |
| *C08J 7/043* | (2020.01) |
| *C09J 7/20* | (2018.01) |
| *C09J 7/25* | (2018.01) |
| *C09J 7/38* | (2018.01) |
| *C09J 7/40* | (2018.01) |
| *C09J 7/50* | (2018.01) |

(52) U.S. Cl.

CPC ................. *C09J 7/20* (2018.01); *C09J 7/255* (2018.01); *C09J 7/38* (2018.01); *C09J 7/40* (2018.01); *C09J 7/50* (2018.01); *B32B 2250/05* (2013.01); *B32B 2250/24* (2013.01); *B32B 2307/702* (2013.01); *B32B 2307/75* (2013.01); *B32B 2377/00* (2013.01); *C08J 2477/00* (2013.01); *C09J 2467/006* (2013.01); *C09J 2477/001* (2013.01)

(56) References Cited

U.S. PATENT DOCUMENTS

| | | | |
|---|---|---|---|
| 4,218,351 | A | 8/1980 | Rasmussen |
| 4,952,650 | A | 8/1990 | Young et al. |
| 5,169,727 | A | 12/1992 | Boardman |
| 6,217,962 | B1 | 4/2001 | Werth |
| 9,163,117 | B2 | 10/2015 | Mitadera et al. |
| 9,301,869 | B2 | 4/2016 | Chang et al. |
| 10,577,494 | B2 | 3/2020 | Zhou et al. |
| 10,919,283 | B2 * | 2/2021 | Keiser .................... B32B 27/20 |
| 11,067,892 | B2 * | 7/2021 | Matsuo .................. G03F 7/202 |
| 2004/0058133 | A1 * | 3/2004 | Bilodeau ................... C09J 7/35 |
| | | | 428/354 |
| 2008/0311813 | A1 | 12/2008 | Ting et al. |
| 2009/0061129 | A1 | 3/2009 | Fraschini et al. |
| 2012/0177859 | A1 | 7/2012 | Gavel et al. |
| 2012/0232504 | A1 | 9/2012 | Chang et al. |
| 2013/0302894 | A1 | 11/2013 | Bekele et al. |
| 2013/0310782 | A1 | 11/2013 | Chang et al. |
| 2017/0267436 | A1 * | 9/2017 | Yamamoto ............. B32B 27/08 |
| 2019/0185662 | A1 | 6/2019 | Zhou et al. |

FOREIGN PATENT DOCUMENTS

| | | | | |
|---|---|---|---|---|
| JP | 2018-127258 | A | 8/2018 | |
| JP | 2021-516270 | A | 7/2021 | |
| WO | 2012/014772 | A1 | 2/2012 | |
| WO | WO-2014126741 | A2 * | 8/2014 | ........ C08G 18/0823 |
| WO | 2017222824 | A1 | 12/2017 | |
| WO | 2019/180107 | A1 | 9/2019 | |
| WO | 2021033146 | A1 | 2/2021 | |

* cited by examiner

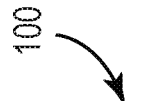
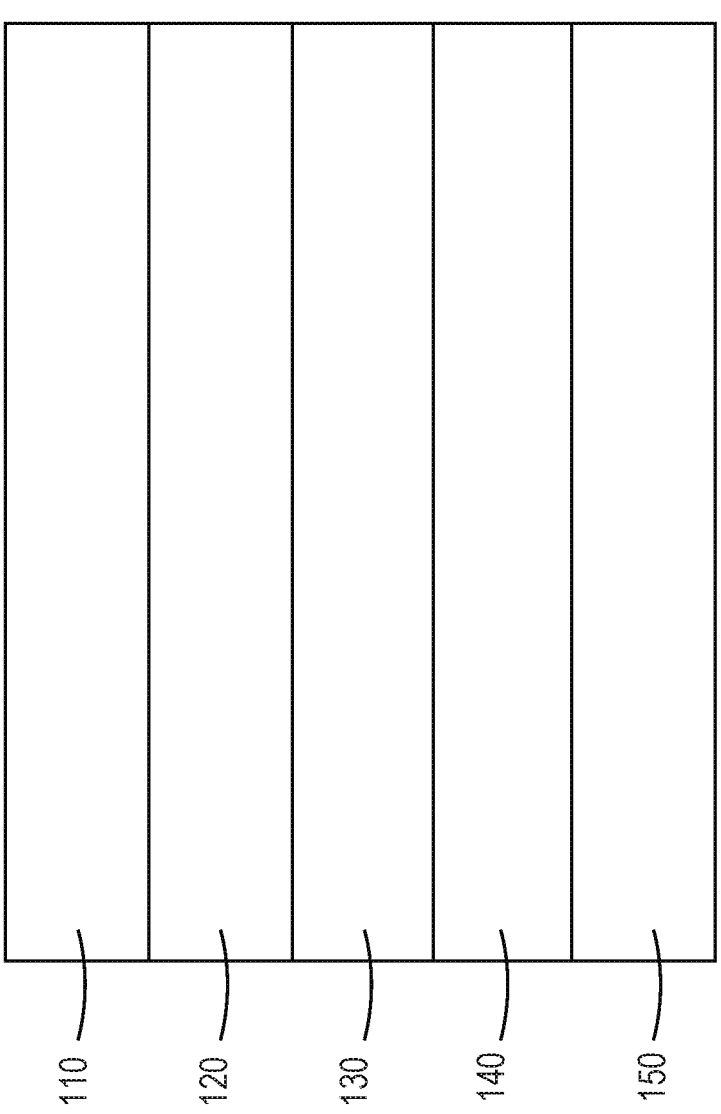
110 120 130 140 150

FILM INCLUDING SOLVENT BARRIER AND PRIMER LAYER

BACKGROUND

Certain films are used for displaying graphics and other visual information once adhered on surfaces. These films may be created in part by printing inks on an ink-receptive surface of such a film. As inks commonly are solvent-borne, some of these solvents may permeate through the thickness of the film and into the adhesive layer, creating undesirable tackiness and poor removability. Certain pressure sensitive adhesives may adhere poorly to the film substrate, making the film prone to delamination without an intermediate layer having adequate adhesion to each of the adhesive and the substrate.

SUMMARY

In one aspect, the present description relates to a film. The film includes a substrate including polylactic acid, a primer layer disposed on the substrate, a barrier layer disposed on a surface of the primer layer opposite the substrate, and an adhesive layer disposed on a surface of the barrier layer opposite the primer layer. The barrier layer includes a polyamide, the polyamide is an amorphous aliphatic polyamide, and the polyamide has a glass transition temperature of at least 40° C.

In another aspect, the present description relates to a method. The method includes providing a substrate including polylactic acid, coating a primer layer on the substrate, and coating a barrier layer on the primer layer. The barrier layer includes an amorphous aliphatic polyamide having a glass transition temperature of at least 40° C.

BRIEF DESCRIPTION OF THE DRAWINGS

FIG. 1 is a side elevation schematic cross-section of a film including a solvent barrier and primer layer.

DETAILED DESCRIPTION

Graphics films, including large format graphics for use in displaying information on vehicles, walls, and signs, are typically provided as an adhesive film, for easy temporary, semi-permanent, or permanent (whether or not removeable) positioning on a substrate. Such films may be uncolored (clear), may be white, or may be any other suitable color. In many cases, the films may be designed to be printable (i.e., may be inherently ink-receptive or may include an ink-receptive coating) so that an image or other information can be transferred onto the film. For example, a brand owner might want to provide an advertisement, logo, or other information on a film to be adhered to a truck or van.

Inks are usually applied by printing. Large format printing is widely available utilizing solvent-borne inks. Latex inks that are water-based exist but are not as commonly used. While inks are typically only applied to the top surface of such a film, solvent used in the most common ink systems permeates through the layers and eventually migrates to the adhesive layer. Solvent migration into the adhesive layer can alter the otherwise carefully tuned properties of the adhesive layer, possibly making application and removability difficult. In some applications, contaminant migration the other way (i.e., from the adhesive into the ink-receptive substrate) may also be an issue.

Films formed from polylactic acid, or polylactide, may in some cases present challenges as suitable primers that adhere well to the PLA film substrate do not adhere satisfactorily to a suitable barrier layer, resulting in unintended and undesirable interlayer delamination.

Constructions described herein and related methods utilize polyamides in a barrier layer, specifically amorphous aliphatic polyamides with a glass transition temperature of at least 40° C. These barrier layers can provide suitable solvent permeation resistance and also adhere acceptably to other layers of films, allowing them to be useful in various applications and environments.

FIG. 1 is a side elevation schematic of film 100 including a solvent barrier and primer layer. Film includes substrate 110, primer layer 120, barrier layer 130, adhesive 140, and liner 150.

Substrate 110 may be any suitable substrate that may have any suitable shape and size. For example, substrate 110 may be formed from or as a cast, calendared, or extruded film substrate. In some embodiments, substrate 110 may be or include polylactic acid. PLA substrates may be formed at least in part from renewable or bio-based sources, including otherwise commonly cultivated crops, such as corn, sugarcane, or beets. Substrate 110, in addition to PLA, may include or contain additives, plasticizers, other polymers, or stabilizers to make such a substrate suitable for long-term or outdoor use. Suitable PLA-based films are described in U.S. Pat. No. 10,577,494 (Zhou et al.), whose description is incorporated herein by reference in its entirety. Substrate 110 may be any suitable thickness and may practically depend on the method by which it is manufactured. For example, the substrate may have a thickness of 10 μm, 15 μm, 20 μm, 25 μm, 30 μm, 40 μm, 50 μm, 60 μm, 70 μm, 80 μm, 90 μm, 100 μm, 125 μm, 150 μm, 175 μm, or 200 μm, or in a range between any two of the values previously listed. In some embodiments, substrate 110 may include a pigment or other colorant. In some embodiments, substrate 110 may include, for example, carbon black or titanium dioxide (white), although any pigment system or blends may be selected for the desired application.

In some embodiments, substrate 110 may include an ink-receptive layer or a surface of substrate 110 may be treated or configured such that it is ink-receptive. Such ink-receptive layers may be useful if film 100 is to be used as a printable or digitally printable graphics film.

Primer layer 120 may be any suitable primer, coated at any suitable thickness. Primer layer 120 may be selected for its ability to adhere to the PLA in substrate 110. Suitable primers include 3M VHB TAPE UNIVERSAL PRIMER UV (available from 3M Company, St. Paul, Minn.). Primer layer 120 may be solvent coated or extruded. In some embodiments, the thickness of the primer layer may be less than 10 μm, may be less than 8 μm, may be less than 6 μm, may be less than 4 μm, may be less than 3 μm, may be less than 2 μm, may be less than 1 μm, or even may be less than 0.5 μm. In some embodiments, the thinness of the primer layer is limited in thickness only by the minimum thickness required to provide the desired adhesion performance. In some embodiments, if the primer layer is extruded, there may be a higher practical thickness due to the need to maintain integrity of the web through the die.

Barrier layer 130 may be selected for its compatibility with the adhesive and with the primer layer. In some embodiments, barrier layer 130 may be solvent coated or extruded. In some embodiments, the thickness of the barrier layer may be less than 10 μm, may be less than 8 μm, may be less than 6 μm, may be less than 4 μm, may be less than 3 μm, may be less than 2 μm, may be less than 1 μm, or even may be less than 0.5 μm. In some embodiments, the thinness of the barrier layer is limited in thickness only by the minimum thickness required to provide the desired barrier performance. In some embodiments, if the barrier layer is extruded, there may be a higher practical thickness due to the need to maintain integrity of the web through the die.

Barrier layer 130 may in some embodiments be or include at least one polyamide. In some embodiments, the polyamide may be an amorphous aliphatic polyamide. In some embodiments, the polyamide may have a glass transition temperature of at least 40° C. In some embodiments, the polyamide has a glass transition temperature of between 40° C. and 70° C. In some embodiments, the polyamide includes secondary amine units resulting in the formation of tertiary amide linkages. Polyamides are often synthesized from at least one diacid and at least one diamine. In some embodiments, polyamides comprising at least one of 2,2,4(2,4,4,)-trimethyl-1,6-hexanediamine or 2,2,4(2,4,4)-trimethyl-1,6-hexanediacid may be used. In some embodiments, the polyamide may include piperazine, or bipiperazine repeat units.

In some embodiments, the barrier layer may include a polyamide that is dissolvable in a polar solvent. In some embodiments, the barrier layer may include a polyamide that is dissolvable in a polar solvent including 1-propanol, or 1-butanol.

Application of the primer layer or the barrier layer may include the application of heat to one or both of the layers. The heat can drive off solvent or crosslink polymers in the layers. In some embodiments, one or more of the layers may be ultraviolet light-curable.

Adhesive layer 140 can be made from or may include a variety of adhesives, including pressure sensitive adhesives. Suitable adhesives may be selected by the skilled artisan and are often selected based upon the type of substrate they are to be adhered to. Classes of pressure sensitive adhesives include acrylics, tackified rubbers, tackified synthetic rubbers, ethylene vinyl acetates, silicones, and the like. Suitable acrylic adhesives are disclosed, for example, in U.S. Pat. Nos. 3,239,478, 3,935,338, 4,952,650, 4,181,752, and 5,169,727.

A particular class of pressure sensitive adhesives that may be useful in this particular application are the reaction product of at least one alkyl acrylate with at least one reinforcing comonomer. Suitable alkyl acrylates are those having a homopolymer glass transition temperature below about −10° C., and include, for example, n-butyl acrylate, 2-ethylhexyl acrylate, isooctyl acrylate, isononlyl acrylate, octadecyl acrylate and the like. Suitable reinforcing monomers are those having a homopolymer glass transition temperature above about −10° C., and include for example, acrylic acid, methylidenesuccinic acid, isobornyl acrylate, N,N-dimethylacrylamide, N-vinyl caprolactam, N-vinyl pyrrolidone, and the like.

The thickness of adhesive layer 140 may be selected for the particular application based upon several factors, including for example, the adhesive composition, whether the adhesive includes microstructured surfaces, the type of substrate, and the thickness of the film. Those skilled in the art are capable of adjusting the thickness to address specific application factors based on the disclosure herein. Adhesive layer 140 may be coated onto a liner and applied to the rest of film 100 or may be coated directly onto or coextruded with the rest of film 100.

Liner 150 is optional in the construction, and typically is a paper or polymeric liner with a coating to provide easy removal from the adhesive layer. In some instances, liner 150 may have a very even, smooth or glossy surface. In other instances, the liner may have surface texture created by a method such as embossing or printing. In some embodiments, the liner includes a structured pattern, such as channels, ridges, or grooves. Such a structured pattern may impart an inverse structure onto the adhesive layer. This pattern may be helpful in applying the adhesive to a surface, providing, for example, easy air release upon initial installation.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modifications and variations of the concepts herein disclosed may be resorted to by those of ordinary skill in the art, and that such modifications and variations are considered to be within the scope of embodiments of the present invention.

EXAMPLES

Polylactide (PLA)-based graphic film construction including polyamide barrier and primer layers were produced. The film was tested for ink solvent barrier properties and adhesion.

These examples are merely for illustrative purposes only and are not meant to be limiting on the scope of the appended claims. All parts, percentages, ratios, etc. in the examples and the rest of the specification are by weight, unless noted otherwise. The following abbreviations are used herein: "=inch, cm=centimeter, mmol=millimole, ° C.=Centigrade, min=minute, s=second, h or hr=hour, g=grams, ml=milliliter, %=percent, RPM=revolutions per minute, mmHg=millimeter of mercury.

Materials:

TABLE 1

| Materials List | | |
| --- | --- | --- |
| DESIGNATION | DESCRIPTION | SOURCE |
| PLA | Polylactide Film | Example 12 of PCT application No. WO 2017/222824 A1 (Zhou et al.) |
| UPUV | 3M VHB Tape Universal Primer UV | 3M Company, St. Paul, MN |
| C6DA | Adipic Acid | TCI, Portland, OR |
| C9DAm | 2,2,4 (2,4,4)-Trimethyl-1,6-hexamethylene Diamine | Sigma-Aldrich, St. Louis, MO |
| C6DAm | Hexamethylene Diamine | Solvay, Rhodia Operations, Saint Fons Cedex, France |
| Pip | Piperazine, anhydrous chips | BASF, Ludwigshafen, Germany |
| ULTRAMID 1C | Polyamide | BASF, Ludwigshafen, Germany |
| PLATAMID HX2592 | Polyamide | Arkema, Colombes, France |
| | Phosphoric Acid (85%) | Alfa Aesar, Haverhill, MA |

TABLE 1-continued

| Materials List | | |
| --- | --- | --- |
| DESIGNATION | DESCRIPTION | SOURCE |
| MEK | Methyl ethyl ketone | Sigma-Aldrich, St. Louis, MO |
| EtOAc | Ethyl Acetate | |

Test Methods:

Adhesion

Polyamide coated primed PLA film specimens were selected for this analysis. The specimens were referenced by the polyamide choice and coating thickness. 0.5" (1.3 cm) strips of the test specimens were cut to 3" (2.6 cm) length, and the opposite side of the coating surface was first supported by a layer of SCOTCH 3750 tape (3M Company, St. Paul, MN). A layer of 3M CONTROLTAC Graphic Film IJ180 (3M Company, St. Paul, MN) was then applied onto the polyamide coating side with a 3M Hand Applicator PA-1 (3M Company, St. Paul, MN) for 2 passes. The test specimens were then conditioned at 25° C. for 30 min, and the applied IJ180 film was finally peeled from the coated PLA substrates. The specimens pass the adhesion test, if the polyamide coating stays on the primed PLA side, leaving the adhesives on the testing tape exposed and tacky. If the polyamide coating transferred onto the adhesive side, making it non-tacky, then the specimens would fail the adhesion test.

Gravimetric Cup Test of MEK Permeation Rate

Test was derived from the Society of Automotive Engineers (SAE) J2665 Test Procedure to Measure the Fuel Permeability of Materials by the Cup Weight Loss Method. The test works by filling a cup with solvent then sealing the cup using a barrier coated film. The cup was placed in an oven and weight of the cup was taken over time. The amount of solvent lost from the cup is a measure of the barrier performance. A coated film sample was placed onto cup after filling the cup with MEK, or EtOAc, (ink simulation) with the polyamide coating side facing up. Film was sealed using a PTFE gasket. The film was covered using a fine wire mesh screen followed by a coarse perforated aluminum plate. Finally, a ring was placed over aluminum plate and tightly screwed down. By restricting the film expansion, the coating thickness remained unstretched and constant. Cups were placed in a 40° C. oven, weighed at time=0 and then over time. Data was plotted as % weight loss as a function of time. Lower MEK loss rate (% solvent loss/hr) was indicative of better barrier performance for the polyamide coating.

Examples

Preparation of Polyamide (C6DA-Co-C9DAm) (PE1)

Adipic acid (69.48 g, 468.7 mmol), 2,2,4-(2,4,4)-trimethyl-1.6-hexamethylene diamine (73.18 g, 462.3 mmol) and phosphoric acid (85%, 2 drops) were charged to a 250 mL 3-necked round-bottomed flask equipped with an overhead stirrer, an inserted thermocouple and a condenser. The reagents were kept under a $N_2$ blanket overnight. The next day, the reaction temperature was first set to 100° C. Manual turning of the agitator was applied when the reagents started to melt. The reaction temperature was then set to slowly increase from 100° C. to 200° C. over the course of an hour under a $N_2$ atmosphere. The overhead agitation speed also increased slowly from 0 RPM to 60 RPM. During this stage of the reaction, the condensed distillate was allowed to flow back into the reaction vessel, the melt temperature increased from 100° C. to 190° C., while the distillate temperature reached 104° C. The reaction set temperature was further increased to 240° C. gradually. The distillate (15.15 g) was then collected over the course of an hour, the polymer melt temperature reached 240° C., while the distillate temperature dropped to 70° C., The polymer melt was finally subjected to 200 mmHg vacuum for 1 h, and reaction product (PE 1) was drained onto a Teflon sheet in air.

Preparation of Polyamide (C6DA-Co-C9DAm/C6DAm/Pip 100-Co-60/20/20) (PE2)

PE2 was synthesized under a similar condition to that for PE1. Adipic acid (74.69 g, 511.1 mmol), hexamethylene diamine (11.68 g, 100.7 mmol), 2,2,4(2,4,4)-trimethyl-1,6-hexamethylene diamine (47.99 g, 303.2 mmol), piperazine (8.70 g, 101.0 mmol), and phosphoric acid (85%, 2 drops) were charged to the reaction vessel instead. The reaction product was finally subjected to 200 mmHg vacuum at 260° C. prior to draining.

Table 2 compares the compositions for a range of custom polyamides prepared using the above disclosed process. Molar amine/acid ratio of 0.98$ was targeted for all compositions.

TABLE 2

| Composition List for Polyamides | | | | |
| --- | --- | --- | --- | --- |
| Preparatory Example | C6DA | C9DAm | C6DAm | Pip |
| PE1 | 100 | 100 | | |
| PE2 | 100 | 60 | 20 | 20 |

Thermal Analysis of Polyamides

Table 3 compares the glass transition temperatures and the melting temperatures, if detectable, for PE1, PE1 and 2 commercial polyamides. The thermal transitions were measured using a TA Q2000 differential scanning calorimeter (TA Instruments New Castle, DE). The specimens were first heated from the ambient temperature to 180° C. at a heating rate of 10° C./min, then cooled to –60° C. at a cooling rate of 20° C./rain, and finally heated to 280° C. at a heating rate of 10° C./min. For samples that do not exhibit a melting transition, the glass transition temperatures from the 2nd heat were reported. For samples that exhibit a melting transition, the glass transition temperature, the crystallization temperature (if observed) and the melting temperature were reported from the 1st heat.

TABLE 3

| Thermal Transitions for Polyamides | | | |
| --- | --- | --- | --- |
| Polyamide | $T_{g, 1}$ (° C.) | $T_c$ (° C.) | $T_m$ (° C.) |
| PE1 | 61 | | |
| PE2 | 55 | | |
| ULTRAMID 1C | 62 | | 125 |
| PLANTAMID HX2592 | 20 | 43 | 81 |

Preparation of Primed PLA Film (PE3)

UPUV primer solution was coated onto the PIA film with a RDS06 Mayer rod (R. D. Specialties, Webster, NY). The coating was subsequently dried in a 70° C. convection oven for 10 min.

Preparation of Polyamide Coating Solutions (PE4-8)

Polyamide coating solution PE4 was prepared by dissolving PE1 in 1-propanol/water (75/25) at 15% solids in a 70° C. water bath for 6 h. Polyamide coating solutions PE5-7 were prepared by dissolving PE2 in 1-propanol/water (75/25) in a 70° C. water bath for 6 h at 5%, 10% and 15% solids, respectively. PE8 was prepared in 1-propanol/water (90/10) instead. The detailed compositions for PE4-8 are shown below,

TABLE 4

Composition of Polyamide Coating Solutions (PE4-8)

| Components | PE4 | PE5 | PE6 | PE7 | PE8 |
|---|---|---|---|---|---|
| PE1 | 1.5 g | | | | |
| PE2 | | 0.5 g | 1.0 g | 1.5 g | |
| ULTRAMID 1C | | | | | 0.7 g |
| PLATAMID HX2592 | | | | | 0.3 g |
| 1-propanol/water (75/25) | 8.5 g | 9.5 g | 9.0 g | 8.5 g | |
| 1-propanol/water (90/10) | | | | | 9.0 g |

Preparation of Comparative Poly-Amide (C6DA-Co-C9DAm) Coated Primed PLA Film (CE1)

Primed PLA film (PE3) was selected as the coating substrate. Polyamide (C6DA-co-C9DAm) coating solution PE4 was coated onto PE3 with a RDS05 Mayer Rod. The coating was subsequently dried in a 70° C. convection oven for 10 min and annealed in a 135° C. convection oven for 30 s.

Preparation of Comparative Polyamide (ULTRA MID 1C/PLATAMID HX2592 70/30) Coated Primed PLA Film (CE2)

Primed PLA film (PE3) was selected as the coating substrate. Polyamide (ULTRAMID 1C/PLATAMID HX259270/30) coating solution PE8 was coated onto PE3 with a RDS05 Mayer Rod. The coating was subsequently dried in a 70° C. convection oven for 10 min and annealed in a 135° C. convection oven for 30 s.

Preparation of Example Polyamide
(C6DA-Co-C9DAm/C6DAm/Pip 100-Co-60/20/20)
Coated Primed PLA Films (E1-3)

E1-3 were prepared similar to CE1, except that polyamide coating solution PE8 was used for E1, PE6 was used for E2 and PE7 was used for E3. The coatings were also prepared with a RDS05 Mayer rod, dried in a 70° C. convection oven for 10 min and annealed in a 135° C. convection oven for 30 s.

Results:

TABLE 5

Adhesion of Polyamide Coatings to PE3

| Results | CE2 | CE1 | E1 | E2 | E3 |
|---|---|---|---|---|---|
| IJ180 Film | Failed | Failed | Pass | Pass | Pass |

TABLE 6

Gravimetric Cup Test of MEK Permeation Rate through polyamide coated PLA film specimens

| | PE3 | CE1 | E1 | E2 | E3 |
|---|---|---|---|---|---|
| MEK Loss Rate (% solvent loss/hr) | 1.95 ± 0.03 | 0.97 ± 0.02 | 1.77 ± 0.16 | 1.42 ± 0.17 | 0.74 ± 0.05 |
| EtOAc Loss Rate (% solvent loss/hr) | 2.12 ± 0.01 | | | | 1.26 ± 0.01 |

What is claimed is:

1. A film, comprising:
a substrate, the substrate including polylactic acid;
a primer layer disposed on the substrate;
a barrier layer disposed on a surface of the primer layer opposite the substrate; and
an adhesive layer disposed on a surface of the barrier layer opposite the primer layer;
wherein the barrier layer includes a polyamide;
wherein the polyamide is (i) an amorphous aliphatic polyamide,
and includes (ii) secondary amine units resulting in tertiary amide linkages.

2. The film of claim 1, wherein the film includes a release liner disposed on a surface of the adhesive layer opposite the barrier layer.

3. The film of claim 1, wherein the polyamide includes piperazine.

4. The film of claim 1, wherein the adhesive is a pressure sensitive adhesive.

5. The film of claim 1, wherein the polyamide of the barrier layer is extrudable.

6. The film of claim 1, wherein the polyamide of the barrier layer dissolves in a polar solvent.

7. The film of claim 6, wherein the polar solvent includes 1-propanol.

8. The film of claim 6, wherein the polar solvent includes 1-butanol.

9. The film of claim 1, further comprising an ink-receptive layer on a surface of the substrate opposite the primer layer.

10. The film of claim 1, wherein the polyamide has (iii) a glass transition temperature of at least 40° C. and at most 70° C.

11. The film of claim 1, wherein the film consists of the substrate, the primer layer, the barrier layer, and the adhesive layer.

12. The film of claim 1, wherein the barrier layer consists of a single layer of the polyamide.

13. The film of claim 1, wherein the barrier layer consists essentially of the polyamide.

* * * * *